United States Patent [19]

Kimura et al.

[11] Patent Number: 5,440,002
[45] Date of Patent: Aug. 8, 1995

[54] ROOM TEMPERATURE CURABLE ORGANOPOLYSILOXANE COMPOSITION HAVING EXCELLENT SHELF STABILITY

[75] Inventors: Tsuneo Kimura, Annaka; Kazuyuki Suzuki, Matsuida; Masatoshi Arai, Annaka, all of Japan

[73] Assignee: Bayer Aktiengesellschaft, Leverkusen, Germany

[21] Appl. No.: 166,008

[22] Filed: Dec. 14, 1993

[30] Foreign Application Priority Data

Dec. 14, 1992 [JP] Japan .................. 4-353584

[51] Int. Cl.$^6$ ............................................. C08G 77/08
[52] U.S. Cl. ....................................................... 528/17
[58] Field of Search ...................................... 528/17, 34

[56] References Cited

U.S. PATENT DOCUMENTS

| | | | |
|---|---|---|---|
| 5,180,771 | 1/1993 | Arai et al. | 528/34 |
| 5,196,477 | 3/1993 | Arai et al. | |
| 5,254,657 | 10/1993 | Inoue | 528/34 |
| 5,326,844 | 7/1994 | Fujiki et al. | 528/17 |

FOREIGN PATENT DOCUMENTS

| | | |
|---|---|---|
| 0392877 | 10/1990 | European Pat. Off. |
| 0492905 | 7/1992 | European Pat. Off. |
| 0579208 | 1/1994 | European Pat. Off. |
| 3056564 | 3/1991 | Japan |

OTHER PUBLICATIONS

Derwent Abstract No. 91-114499, Database WPI, Derwent Publications Ltd., London, GB.

*Primary Examiner*—Melvyn I. Marquis
*Attorney, Agent, or Firm*—Sprung Horn Kramer & Woods

[57] ABSTRACT

A dealcoholation condensation type room temperature curable composition of the present invention comprises (A) a diorganopolysiloxane blocked by mono-, di- or tri-alkoxysilyl group at both terminal ends, (B) an alkoxysilane having the formula (1):

$$R^1_{4-n}Si(OR^2)_n \qquad (1)$$

wherein $R^1$ and $R^2$ are a monovalent hydrocarbon group and n is 3 or 4, or a partially hydrolyzed product thereof, (C) a titanate ester or a titanium complex and (D) an organosilicon compound having the formula (2):

$$(R^7O)_{3-a}-\underset{\underset{R^4}{|}}{\overset{\overset{(R^5)_a}{|}}{Si}}-\underset{}{\overset{\overset{R^3}{|}}{C}}(CH_2)_{\overline{m}}COOR^6 \qquad (2)$$

wherein $R^3$ and $R^4$ are a hydrogen atom or an alkyl group, $R^5$ and $R^6$ are each a monovalent hydrocarbon group, $R^7$ is an alkyl group or an alkoxyalkyl group, a is 0 or 1 and m is an integer of 0 to 3. The composition is very excellent in shelf stability.

7 Claims, No Drawings

ROOM TEMPERATURE CURABLE ORGANOPOLYSILOXANE COMPOSITION HAVING EXCELLENT SHELF STABILITY

BACKGROUND OF THE INVENTION

1. Field of the Invention

The present invention relates to a dealcoholation condensation type room temperature curable organopolysiloxane composition and particularly to a condensation type room temperature curable organopolysiloxane composition which is excellent in shelf stability in the uncured state.

2. Description of the Prior Art

As dealcoholation condensation type room temperature curable organopolysiloxane compositions, there are known those containing a diorganopolysiloxane terminated with hydroxyl group at both terminal ends of the molecular chain as the base component. In order to block the hydroxyl group at both terminal ends of the molecular chain of said diorganopolysiloxane, various kinds of alkoxysilanes are added to said compositions. When a reaction for the blocking proceeds, alcohol is released in the system and causes a problem of considerably lowering the shelf stability of said compositions.

In order to prevent the lowering of the shelf stability caused by the release of alcohol, it is known to use a diorganopolysiloxane previously blocked by an alkoxyl group at both terminal ends of the molecular chain. For example, as the dealcoholation type room temperature curable organopolysiloxane composition having the diorganopolysiloxane blocked by alkoxyl group, Japanese Patent Publication (KOKOKU) No. 1-113429 (1989) discloses a composition in which a tin compound is used as a catalyst, and Japanese Patent Publication (KOKOKU) No. 61-034063 (1986) discloses a low-modulus type composition in which an extending filler such as calcium carbonate and a small amount of a reinforcing filler are used in combination as fillers.

However, even in said compositions it is not achieved yet to improve the shelf stability thereof to a satisfactory level.

SUMMARY OF THE INVENTION

Accordingly, the task of the present invention is to effectively prevent the lowering of the shelf stability caused by the release of alcohol in the dealcoholation condensation type room temperature curable organopolysiloxane composition and to provide a composition with a markedly improved shelf stability.

According to the present invention, there is provided a room temperature curable organopolysiloxane composition comprising:

(A) 100 parts by weight of a diorganopolysiloxane blocked by a mono-, di- or tri-alkoxysilyl group at both terminal ends of the molecular chain, (B) from 1 to 25 parts by weight of at least one member selected from the group consisting of an alkoxysilane represented by the general formula (1):

$$R^1{}_{4-n}Si(OR^2)_n \qquad (1)$$

wherein $R^1$ and $R^2$ may be the same or different and are each an unsubstituted or substituted monovalent hydrocarbon group and n is 3 or 4, and a partially hydrolyzed product duct thereof, (C) from 0.01 to 10 parts by weight of a titanate ester or a titanium complex, and (D) from 1 to 10 parts by weight of an organosilicon compound represented by the general formula (2):

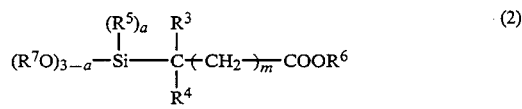

wherein $R^3$ and $R^4$ are each a hydrogen atom or an alkyl group and may be the same or different, $R^5$ and $R^6$ are each a substituted or unsubstituted monovalent hydrocarbon group and may be the same or different, $R^7$ is an alkyl group or an alkoxyalkyl group, a is 0 or 1, and m is an integer of 0 to 3.

The important characteristic of the dealcoholation condensation type room temperature curable composition of the present invention consists in the addition of the organosilicon compound as represented by the general formula (2) (Component D) along with the titanium-based compound (Component C) as a curing catalyst. By using these components in combination, a marked improvement in the shelf stability of the curable composition has been successfully made.

DETAILED DESCRIPTION OF THE INVENTION

Component (A)

In the present invention, the diorganopolysiloxane used as the component (A) is linear and both terminal ends thereof are blocked by a mono-, di- or tri-alkoxysilyl group. These alkoxyl groups are hydrolyzed by moisture in the air together with the alkoxysilane, the below-mentioned component (B), and by condensation they form a cured product of a rubber-like elastomer. Such a diorganopolysiloxane is conventionally used as a base component of dealcoholation condensation type room temperature curable compositions and is, for example, expressed by the following general formula (3):

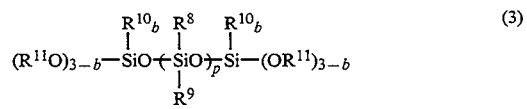

wherein $R^8$–$R^{11}$ are each a substituted or unsubstituted monovalent hydrocarbon group and may be the same or different from each other, b is an integer of 0 to 2, and p is a positive integer.

In the general formula (3) the monovalent hydrocarbon groups, $R^8$–$R^{11}$, preferably have 1 to 8 carbon atoms and include specifically, for example, an alkyl group such as methyl, ethyl and propyl; a cycloalkyl group such as cyclohexyl; an alkenyl group such as vinyl and allyl; an aryl group such as phenyl and tolyl; an aralkyl group such as benzyl and phenylethyl; and a group derived from the above groups by substitution of halogen atoms or the like for a part or all of the hydrogen atoms thereof such as chloromethyl and 3,3,3-trifluoropropyl. Further, in the diorganopolysiloxane it is necessary for the group "$R^{11}O-$" to be a highly hydrolyzable alkoxyl group in order to proceed with curing rapidly. Accordingly, the group $R^{11}$ is preferably to have a relatively low molecular weight among said monovalent hydrocarbon groups and particularly, for example, to have 6 or less carbon atoms.

Furthermore, b is an integer of 0 to 2. Consequently, it should be understood that there exists at least one alkoxyl group "$R^{11}O-$" at terminal ends of said diorganopolysiloxane molecule.

Further, it is preferable that the diorganopolysiloxane of the component (A) has a viscosity at 25° C. in the range of 25 to 500,000 cSt, more preferably 1,000 to 100,000 cSt. From such a viewpoint, p in the above general formula (3) is preferably an integer of 10 or more.

Component (B)

The alkoxysilane or its partially hydrolyzed product of the component (B) acts as a crosslinking agent. The alkoxysilane is represented by the above general formula (1), that is, $$R^1_{4-n}Si(OR^2)_n \qquad (1)$$

wherein $R^1$, $R^2$ and n are as defined above.

In the general formula (1), $R^1$ and $R^2$, unsubstituted or substituted monovalent hydrocarbon groups, preferably have 1 to 8 carbon atoms and include specifically, for example, the same groups as exemplified for the groups of $R^8$ to $R^{11}$ in the above general formula (3).

In the present invention, the alkoxysilane and its partially hydrolyzed product include, as typical examples, tetramethoxysilane, tetraethoxysilane, tetra-n-propoxysilane, tetraisopropoxysilane, methyltri(methoxy)silane, vinyltri(methoxy)silane, phenyltri(methoxy)silane, propyltri(methoxy)silane, methyltri(ethoxy)silane, vinyltri(ethoxy)silane, methyltri(propoxy)silane, vinyltri(propoxy)silane, 3-chloropropyltri(methoxy)silane, 3,3,3-trifluoropropyltri(methoxy)silane and their partially hydrolyzed products. These alkoxysilanes can be obtained by carrying out dehydrochlorination reaction of an alcohol and a silane halide corresponding to a desired alkoxysilane, in the presence of an organic amine such as triethylamine and dimethylaniline, as an acid scavenger. In addition, the structure of the partially hydrolyzed product of the alkoxysilane may be linear, cyclic or branched.

The above-described component (B) is used in an amount of 1 to 25 parts by weight, particularly 5 to 10 parts by weight, per 100 parts by weight of the above component (A). If it is less than 1 part by weight, gelation may occur in the process of manufacturing or storing the composition, and cured products obtained therefrom will not exhibit properties intended. If it is used in the amount of more than 25 parts by weight, shrinkage on curing of the composition becomes large and elasticity of the cured products thereof lowers.

Component (C)

The component (C) acts as a curing catalyst, and a titanate ester or a titanium complex is used. The titanate ester includes, for example, tetraisopropoxytitanium, tetra-n-butoxytitanium, tetrabis(2-ethylhexyloxy)titanium, titanium isopropoxyoctylene glycolate, and the like. In addition, the titanium complex includes, for example, titanium diisopropoxide bis (acetylacetonate) titanium diisopropoxide bis (ethylacetoacetonate), and the like.

Said component (C) is used in an amount of 0.01 to 10 parts by weight, particularly 0.1 to 5 parts by weight, per 100 parts by weight of the component (A). If it is less than 0.01 parts by weight, it a takes long time to form a tack-free film when the composition is exposed to the air, and its internal curing property is lowered. If it is used in the amount of more than 10 parts by weight, film-forming time is extremely shortened to several seconds. Thus, not only workability of the composition lowers conspicuously but also its shelf stability in the uncured state lowers as well.

Furthermore, in the present invention it is quite important to use the above-mentioned titanium-based compound as the curing catalyst. For example, as the curing catalyst for the condensation curing type organopolysiloxane composition, for example, tin-based compounds are widely used. If a tin-based compound is used as a curing catalyst for the composition of the present invention, the resulting composition in the uncured state is apt to change in color during storage and its thermal resistance after curing is poor. In addition, since tin compounds are generally toxic, their application to food and medical care uses is restricted, but the titanium-based compound has an advantage of high non-toxicity since it changes into its metal oxide, titanium oxide, after hydrolysis. Consequently, in the present invention it is indispensable to use the titanium-based compound as the curing catalyst.

Component (D)

The component (D) acts as an alcohol scavenger, and the silicon compound represented by the above general formula (2) is used.

In the general formula (2), $R^3$ and $R^4$ are each a hydrogen atom or an alkyl group. As the alkyl group, preferable is, for example, a lower alkyl group of 6 or less carbon atoms, such as methyl, ethyl, propyl and butyl.

Further, $R^5$ is a substituted or unsubstituted monovalent hydrocarbon group preferably having 1 to 8 carbon atoms, and includes, for example, the same groups as exemplified for the groups of $R^8$ to $R^{11}$ in the above general formula (3). In the present invention, particularly preferable are a methyl group, a vinyl group, a phenyl group, and the like.

$R^6$ is a substituted or unsubstituted monovalent hydrocarbon group preferably having 1 to 8 carbon atoms, and includes, for example, a methyl group, an ethyl group, a propyl group, a butyl group, an octyl group, a 2-ethylhexyl group, a cyclohexyl group, a phenyl group, a benzyl group, and the like.

$R^7$ is an alkyl group or an alkoxyalkyl group, and preferably includes, for example, a methyl group, an ethyl group, a propyl group, a methoxymethyl group, a methoxyethyl group, and the like. In addition, a is 0 or 1, and m is an integer of 0 to 3.

As the organosilicon compound represented by the general formula (2) in the present invention, those having m=0 are particularly preferable and the following formulae are shown as specific examples, wherein Me denotes a methyl group, Et an ethyl group, Pr a propyl group, Bu a butyl group, Ph a phenyl group, and cyclohexyl a cyclohexyl group.

$(MeO)_3SiCH_2COOMe$,
$(MeO)_3SiCH_2COOEt$,
$(MeO)_3SiCH_2COOPr$,
$(MeO)_3SiCH_2COOBu$,
$(MeO)_3SiCH_2COOC_8H_{17}$,
$(MeO)_3SiCH_2COOPh$,
$(MeO)_3SiCH_2COO$-cyclo-hexyl,
$(MeO)_2MeSiCHMeCOOMe$,
$(MeO)_2MeSiCHMeCOOEt$,
$(MeO)_2MeSiCHMeCOOPr$, (MeO)$_2$MeSiCHMeCOOBu,
(MeO)$_2$MeSiCHMeCOOC$_8$H$_{17}$,
(MeO)$_2$MeSiCHMeCOOPh,
(MeO)$_2$MeSiCHMeCOO-cyclo-hexyl,
(MeO)$_2$MeSiCH$_2$COOMe,
(MeO)$_2$MeSiCH$_2$COOEt,
(MeO)$_2$MeSiCH$_2$COOPr,
(MeO)$_2$MeSiCH$_2$COOBu,
(MeO)$_2$MeSiCH$_2$COOCSH$_{17}$,
(MeO)$_2$MeSiCH$_2$COOPh,
(MeO)$_2$MeSiCH$_2$COO-cyclo-hexyl,
(MeO)$_2$EtSiCHMeCOOMe,
(MeO)$_2$EtSiCHMeCOOEt,
(MeO)$_2$EtSiCHMeCOOPr,
(MeO)$_2$EtSiCHMeCOOBu,
(MeO)$_2$EtSiCHMeCOOC$_8$H$_{17}$,
(MeO)$_2$EtSiCHMeCOOPh,
(MeO)$_2$EtSiCHMeCOO-cyclo-hexyl,
(EtO)$_3$SiCH$_2$COOMe,
(EtO)$_3$SiCH$_2$COOEt,
(EtO)$_3$SiCH$_2$COOPr,
(EtO)$_3$SiCH$_2$COOBu,
(EtO)$_3$SiCH$_2$COOC$_8$H$_{17}$,
(EtO)$_3$SiCH$_2$COOPh
(EtO)$_3$SiCH$_2$COO-cyclo-hexyl,
(MeO)$_2$PhSiCHMeCOOMe,
(MeO)$_2$PhSiCHMeCOOEt,
(MeO)$_2$PhSiCHMeCOOPr,
(MeO)$_2$PhSiCHMeCOOBu,
(MeO)$_2$PhSiCHMeCOOC$_8$H$_{17}$,
(MeO)$_2$PhSiCHMeCOOPh,
(MeO)$_2$PhSiCHMeCOO-cyclo-hexyl,
(MeO)$_3$SiCHMeCOOMe,
(MeO)$_3$SiCHMeCOOEt,
(MeO)$_3$SiCHMeCOOPr,
(MeO)$_3$SiCHMeCOOBu,
(MeO)$_3$SiCHMeCOOC$_8$H$_{17}$,
(MeO)$_3$SiCHMeCOOPh,
(MeO)$_3$SiCHMeCOO-cyclo-hexyl,
(EtO)$_3$SiCHMeCOOMe,
(EtO)$_3$SiCHMeCOOEt,
(EtO)$_3$SiCHMeCOOPr,
(EtO)$_3$SiCHMeCOOBu,
(EtO)$_3$SiCHMeCOOC$_8$H$_{17}$,
(EtO)$_3$SiCHMeCOOPh,
(EtO)$_3$SiCHMeCOO-cyclo-hexyl,
(BuO)$_3$SiCH$_2$COOMe,
(BuO)$_3$SiCH$_2$COOEt,
(BuO)$_3$SiCH$_2$COOPr,
(C$_8$H$_{17}$O)$_3$SiCH$_2$COOMe,
(C$_8$H$_{17}$O)$_3$SiCH$_2$COOEt,
(C$_8$H$_{17}$O)$_3$SiCH$_2$COOPr,
(MeO)$_3$SiCHEtCOOMe,
(MeO)$_3$SiCHEtCOOEt,
(MeO)$_3$SiCHEtCOOPr.

The organosilicon compounds can be produced in the manner known per se.

The above organosilicon compounds are added in the amount of 1 to 10 parts by weight, particularly 1 to 5 parts by weight, per 100 parts by weight of the component (A). In case of less than 1 part by weight, their effect intended is unsatisfactorily obtained. Even though it is more than 10 parts by weight, the effect is not improved any more and becomes economically disadvantageous.

Other compounding agents

Besides the above-mentioned components of (A) to (D) in the present invention, there can be added a compounding agent which is known per se and includes, for example, a reinforcing agent such as fumed silica, precipitated silica, titanium dioxide, aluminum oxide, ground quartz, talc, and bentonite; a fibrous filler such as glass fibers and organic fibers; a colorant; a heat resistance improver such as red oxide and cerium oxide; a cold resistance improver; a thixotropy agent such as polyether; a dehydrating agent; an adhesion improver such as γ-glycidoxypropyltrimethoxysilane; a softening agent such as dialkylpolysiloxane blocked by trialkylsilyl group at both terminal ends; and the like. These may be used within the amount where the effects of the present invention to improve the shelf stability is not impaired.

Curable composition

The composition of the present invention is obtained as a one-pack type room temperature curable composition by mixing uniformly both the above-mentioned components of (A) to (D) and the other compounding agent, optionally added, in prescribed amounts in a dry atmosphere. When the composition is exposed to the air, it is crosslinked with moisture in the air to cure to form a rubber-like elastomer.

In this composition there is almost no property change with time in the uncured state, and its shelf stability is very excellent. In addition, since these constituent components of (A) to (D) are available relatively easily, the composition is highly practical.

The composition can be used for the purposes of coating materials, adhesives and the like in the fields of architecture, electric industry and electronic industry in view of its good heat resistance, cold resistance and flame resistance, and besides it can be advantageously used for the purposes of medical care and food because of low toxicity and low smelling.

EXAMPLES

In the following examples of the present invention, the term "parts" denotes "parts by weight" and "viscosity" denotes "viscosity measured at 25° C.".

Examples 1 to 3

Comparative Example 1

A base composition was prepared under a water-free condition by mixing the materials below.

Dimethylpolysiloxane having a viscosity of 20,000 cSt, blocked by the trimethoxysilyl group at both terminal ends of the molecular chain 100 parts Dimethylpolysiloxane having a viscosity of 100 cSt, blocked by the trimethyl group at both terminal ends of the molecular chain 8 parts Fumed silica 20 parts Vinyltrimethoxysilane 3.0 parts Tetrapropoxytitanium 1.0 part Furthermore, to 100 parts of the above base composition, 1.0 part of methyl 2-trimethoxysilylpropionate, ethyl 2-trimethoxysilylpropionate or 2-ethylhexyl 2-trimethoxysilylpropionate was added, and the materials were mixed under a water-free condition to prepare three kinds of curable compositions (Examples 1 to 3).

Each of the curable compositions was formed into a sheet with a thickness of 2.0 mm and left in an atmosphere of 20° C. and 50 % relative humidity for 7 days to cure and obtain a rubber-like elastomer. The rubber-like elastomer was tested for rubber properties in accordance with JIS-K-6301. The results are shown as Initial properties in Table 1.

Further, in order to confirm the shelf stability, after each of the above curable compositions in the uncured state was kept under a water-free condition at 70° C. for 240 hours, it was formed into a sheet 2 mm thick. Then, after the sheet was left in the atmosphere of 20° C. and 50 % relative humidity for 7 days to form a rubber-like elastomer, their rubber properties were tested. The results are shown as Properties after storage in Table 1.

Furthermore, for comparison, the base composition with no additional materials was treated the Initial properties and the Properties after storage in the same manner as above (Comparative Example 1). The results are shown in Table 1.

TABLE 1

|  | Comparative Example 2 | Example 4 | Example 5 | Example 6 |
|---|---|---|---|---|
| Alcohol scavenger | Nil | Methyl 2-trimethoxy-silylpropionate | Ethyl 2-trimethoxy-silylpropionate | 2-ethylhexyl 2-trimethoxy-silylpropionate |
| Initial properties |  |  |  |  |
| Hardness (JIS A) | 37 | 40 | 37 | 37 |
| Elongation (%) | 430 | 420 | 450 | 500 |
| Tensile strength (kg/cm$^2$) | 32 | 30 | 35 | 33 |
| Properties after storage |  |  |  |  |
| Hardness (JIS A) | Not cured | 38 | 35 | 36 |
| Elongation (%) | Not cured | 450 | 500 | 520 |
| Tensile strength (kg/cm$^2$) | Not cured | 27 | 33 | 30 |

*Hardness was measured by using a Type A spring hardness tester according to JIS K 6301.

Examples 4 to 6

Comparative Example 2

Eighty parts of a dimethylpolysiloxane having a viscosity of 900 cSt, blocked by the trimethoxysilyl group at both terminal ends of the molecular chain, and 12 parts of fumed silica were mixed at 150° C. for 2 hours under a reduced pressure and the mixture obtained was cooled to room temperature in a dry nitrogen atmosphere.

With this mixture, mixed were 3.0 parts of vinyltrimethoxysilane and 1.0 part of tetraethoxytitanium in a water-free conditions to prepare a base composition.

From the base composition obtained, three kinds of compositions were prepared in the same manner as in Examples 1 to 3 and were similarly subjected to the measurement of the initial properties and the properties after storage (Examples 4–6). The results are shown in Table 2.

Furthermore, the above base composition, with no additional materials was treated in the same manner as in Examples 4–6 for the measurement of the initial properties and the properties after storage (Comparative Example 2). The results are shown in Table 2.

What is claimed is:

1. A room temperature curable organopolysiloxane composition consisting of:
   (A) 100 parts by weight of a diorganopolysiloxane blocked by a mono-, di- or tri-alkoxysilyl group at both terminal ends of the molecular chain,
   (B) from 1 to 25 parts by weight of at least one member selected from the group consisting of an alkoxysilane represented by the general formula (1):

$$R^1{}_{4-n}Si(OR^2)_n \qquad (1)$$

wherein $R^1$ and $R^2$ may be the same or different and are each an unsubstituted or substituted monovalent hydrocarbon group and n is 3 and 4, and a partially hydrolyzed product thereof,
   (C) from 0.01 to 10 parts by weight of a titanate ester or a titanium complex, and
   (D) from 1 to 10 parts by weight of an organosilicon compound represented by the general formula (2):

$$(R^7O)_{3-a}-\underset{\underset{(R^5)_a}{|}}{Si}-\underset{\underset{R^4}{|}}{\overset{\overset{R^3}{|}}{C}}(CH_2)_m-COOR^6 \qquad (2)$$

wherein $R^3$ and $R^4$ are each a hydrogen atom or an alkyl group and may be the same or different, $R^5$ and $R^6$ are each a substituted or unsubstituted monovalent hydrocarbon group and may be the same or different, $R^7$ is an alkyl group or an alkoxyalkyl group, a is 0 or 1, and m is an integer of 0 to 3.

2. The composition of claim 1, wherein the component (D) is the organosilicon compound represented by the general formula (2) where m is 0.

TABLE 2

|  | Comparative Example 2 | Example 4 | Example 5 | Example 6 |
|---|---|---|---|---|
| Alcohol scavenger | Nil | Methyl 2-trimethoxy-silylpropionate | Ethyl 2-trimethoxy-silylpropionate | 2-ethylhexyl 2-trimethoxy-silylpropionate |
| Initial properties |  |  |  |  |
| Hardness (JIS A) | 40 | 41 | 38 | 40 |
| Elongation (%) | 140 | 130 | 140 | 130 |
| Tensile strength (kg/cm$^2$) | 20 | 21 | 19 | 20 |
| Properties after storage |  |  |  |  |
| Hardness (JIS A) | Not cured | 40 | 36 | 38 |
| Elongation (%) | Not cured | 130 | 150 | 130 |
| Tensile strength (kg/cm$^2$) | Not cured | 20 | 19 | 19 |

3. The composition of claim 1, wherein the diorganopolysiloxane of the component (A) has a viscosity at 25° C. in the range of 25 to 500,000 cSt.

4. The composition of claim 1, wherein the component (C) is at least one titanate ester selected from the group consisting of tetraisopropoxytitanium, tetra-n-butoxytitanium, tetrabis(2-ethylhexyloxy)titanium and titanium isopropoxyoctylene glycolate.

5. The composition of claim 1, wherein the component (C) is titanium diisopropoxide bis(acetylacetonate) or titanium diisopropoxide bis(ethylacetoacetonate).

6. The composition of claim 1, wherein the component (D) is an organosilicon compound represented by the general formula (2) where $R^3$ and $R^4$ are each a hydrogen atom or an alkyl group of 6 or less carbon atoms, $R^5$ and $R^6$ are each a monovalent hydrocarbon group of 1 to 8 carbon atoms, and $R^7$ is a methyl group, an ethyl group, a propyl group, a methoxymethyl group or a methoxyethyl group.

7. A cured product obtained by curing a composition as claimed in claim 1.

* * * * *

UNITED STATES PATENT AND TRADEMARK OFFICE
CERTIFICATE OF CORRECTION

PATENT NO.  : 5,440,002
DATED       : August 8, 1995
INVENTOR(S) : Tsuneo KUMURA, et al.

It is certified that error appears in the above-indentified patent and that said Letters Patent is hereby corrected as shown below:

On the title page, Item [73], the Assignee should read:

--Shin-Etsu Chemical Co., Ltd., Tokyo, Japan--

On the title page, Item [56], the Attorney, Agent, or Firm should read:

--Oblon, Spivak, McClelland, Maier & Neustadt--

Signed and Sealed this

Ninth Day of January, 1996

*Attest:*

BRUCE LEHMAN

*Attesting Officer*   Commissioner of Patents and Trademarks